(12) United States Patent
Tu et al.

(10) Patent No.: US 9,971,623 B2
(45) Date of Patent: May 15, 2018

(54) ISOLATION METHOD FOR MANAGEMENT VIRTUAL MACHINE AND APPARATUS

(71) Applicant: Huawei Technologies Co., Ltd., Shenzhen (CN)

(72) Inventors: Bin Tu, Shenzhen (CN); Haibo Chen, Shanghai (CN); Yubin Xia, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 139 days.

(21) Appl. No.: 14/795,225

(22) Filed: Jul. 9, 2015

(65) Prior Publication Data
US 2015/0309832 A1    Oct. 29, 2015

Related U.S. Application Data

(63) Continuation of application No. PCT/CN2014/078095, filed on May 22, 2014.

(30) Foreign Application Priority Data

Mar. 24, 2014    (CN) .......................... 2014 1 0110050

(51) Int. Cl.
*G06F 9/455*    (2018.01)
*G06F 21/53*    (2013.01)

(52) U.S. Cl.
CPC .......... *G06F 9/45558* (2013.01); *G06F 21/53* (2013.01); *G06F 2009/45575* (2013.01); *G06F 2009/45587* (2013.01)

(58) Field of Classification Search
None
See application file for complete search history.

(56) References Cited

U.S. PATENT DOCUMENTS 8,327,353 B2    12/2012    Traut
8,539,137 B1     9/2013    Protassov et al.
(Continued)

FOREIGN PATENT DOCUMENTS

CN    101071387 A    11/2007
CN    101599022 A    12/2009
(Continued)

OTHER PUBLICATIONS

Witten, B., et al., "Engineering Sufficiently Secure Computing," Proceedings of the 22nd Annual Computer Security Applications Conference (ACSAC'06), Dec. 2006, 14 pages.
(Continued)

*Primary Examiner* — Lewis A Bullock, Jr.
*Assistant Examiner* — Bruce S Ashley
(74) *Attorney, Agent, or Firm* — Conley Rose, P.C.

(57) ABSTRACT

An isolation method for a management virtual machine and an apparatus, which resolves problems that performance of communication between service components is deteriorated, more resources are required for running a virtual machine, and security of the service components is relatively low. The method includes: acquiring a guest identifier; searching, according to the guest identifier, the management virtual machine for a kernel virtual machine; when the kernel virtual machine is not found in the management virtual machine, creating the kernel virtual machine in the management virtual machine; dividing a service provided for a guest virtual machine by the kernel virtual machine into multiple service components; and running the multiple service components in execution environments corresponding to permission of the service components, where the kernel virtual machine includes the multiple execution environments, and the multiple execution environment have different permission.

23 Claims, 9 Drawing Sheets

(56) References Cited

U.S. PATENT DOCUMENTS

| | | | |
|---|---|---|---|
| 8,595,487 | B2 | 11/2013 | Govil et al. |
| 2005/0223220 | A1 | 10/2005 | Campbell et al. |
| 2006/0236127 | A1 | 10/2006 | Kurien et al. |
| 2010/0192152 | A1* | 7/2010 | Miyamoto .............. G06F 9/485 718/102 |
| 2011/0047542 | A1 | 2/2011 | Dang et al. |
| 2011/0173251 | A1* | 7/2011 | Sandhu .................... G06F 8/61 709/203 |
| 2012/0102198 | A1* | 4/2012 | Cahill .................. G06F 9/5077 709/226 |
| 2013/0074064 | A1* | 3/2013 | Das ...................... G06F 9/5077 718/1 |
| 2013/0117823 | A1* | 5/2013 | Dang ..................... G06F 9/468 726/4 |
| 2013/0347131 | A1 | 12/2013 | Mooring et al. |

FOREIGN PATENT DOCUMENTS

| | | |
|---|---|---|
| CN | 101661381 A | 3/2010 |
| CN | 102129531 A | 7/2011 |
| CN | 102707985 A | 10/2012 |
| CN | 102930213 A | 2/2013 |
| CN | 102938035 A | 2/2013 |

OTHER PUBLICATIONS

"Secure Virtual Machine Systems," Chapter 11, Retrieved from the Internet: URL:http://www.cse.psu.edu/~trj1/cse443-s12/docs/ch11.pdf [retrieved on Jan. 19, 2016], pp. 153-167.

Foreign Communication From a Counterpart Application, European Application No. 14870659.1, Extended European Search Report dated Jan. 27, 2016, 9 pages.

Partial English Translation and Abstract of Chinese Patent Application No. CN101661381, Part 1, dated Jun. 19, 2015, 4 pages.

Partial English Translation and Abstract of Chinese Patent Application No. CN101661381, Part 2, dated Jun. 19, 2015, 3 pages.

Partial English Translation and Abstract of Chinese Patent Application No. CN101599022, dated Sep. 24, 2015, 14 pages.

Partial English Translation and Abstract of Chinese Patent Application No. CN102930213, dated Sep. 24, 2015, 14 pages.

Colp, P., et al., "Breaking Up is Hard to Do: Security and Functionality in a Commodity Hypervisor," Department of Computer Science, SOSP, Oct. 23-26, 2011, 14 pages.

Thibault, S., et al., "Improving Performance by Embedding HPC Applications in Lightweight Xen Domains," 2nd Workshop on System-level Virtualization for High Performance COmuting, Oct. 13, 2008, 7 pages.

Murray, D., et al., "Improving Xen Security through Disaggregation," Mar. 5-7, 2008, 10 pages.

Butt, S., et al., "Self-Service Cloud Computing," Published in Proceedings of the 19th ACM Conference on Computer and Communications Security (CCS), Oct. 2012, 12 pages.

LeVasseur, J., et al., "Unmodified Device Driver Reuse and Improved System Dependability via Virtual Machines," USENIX Association, OSDI '04: 6th Symposium on Operating Systems Design and Implementation, 2004, pp. 17-30.

Foreign Communication From a Counterpart Application, PCT Application No. PCT/CN2014/078095, English Translation of International Search Report dated Dec. 26, 2014, 2 pages.

Foreign Communication From a Counterpart Application, PCT Application No. PCT/CN2014/078095, Written Opinion dated Dec. 26, 2014, 5 pages.

Machine Translation and Abstract of Chinese Publication No. CN102129531, dated Jul. 20, 2011, 7 pages.

Machine Translation and Abstract of Chinese Publication No. CN102707985, dated Oct. 3, 2012, 10 pages.

Foreign Communication From a Counterpart Application, Chinese Application No. 201410110050.5, Chinese Office Action dated Jul. 19, 2017, 5 pages.

* cited by examiner

ISOLATION METHOD FOR MANAGEMENT VIRTUAL MACHINE AND APPARATUS

CROSS-REFERENCE TO RELATED APPLICATIONS

This application is a continuation of International Application No. PCT/CN2014/078095, filed on May 22, 2014, which claims priority to Chinese Patent Application No. 201410110050.5, filed on Mar. 24, 2014, both of which are hereby incorporated by reference in their entireties.

TECHNICAL FIELD

The present invention relates to the field of computer technologies, and in particular, to an isolation method for a management virtual machine and an apparatus.

BACKGROUND

In recent years, development of cloud computing led to wide application of a virtualization technology that serves as one of basic support technologies of cloud computing. Multiple virtual machines may simultaneously run on one physical host by using the virtualization technology. In this way, a resource utilization rate and resource allocation flexibility may be improved. However, a security risk is also caused at the same time. When a vulnerability of one virtual machine affects a virtual machine monitor (VMM) at a bottom layer, other virtual machines on a same physical host as the virtual machine are all affected.

Currently, a physical host in a common Xen virtualization system includes two key components: a Hypervisor (a virtual machine manager) and a domain-0 (a management virtual machine of a Xen platform). A great number of vulnerabilities generally occur in code of the domain-0; therefore, to prevent a vulnerability of one virtual machine from affecting other virtual machines on a physical host on which the virtual machine is located, isolating the domain-0 and ensuring security of the domain-0 has become an urgent problem to be resolved.

In the prior art, some service components of a domain-0 may be removed from the domain-0, and the service components may be placed into other different independent virtual machines to run, so that the service components in the domain-0 are isolated from each other, thereby ensuring security of the domain-0.

However, in the foregoing method of ensuring the security of the domain-0 by using different virtual machines: on one hand, a manner of communication between some service components in the domain-0 changes from original interprocess communication into inter-virtual machine communication, thereby deteriorating performance of communication between the service components, and requiring more resources for running a virtual machine; and on the other hand, a level of a service component is not involved, resulting in relatively low security of the service components in the domain-0.

SUMMARY

Embodiments of the present invention provide an isolation method for a management virtual machine and an apparatus, which resolve problems that performance of communication between service components is relatively poor, many resources are required for running a virtual machine, and security of the service components is relatively low.

To achieve the foregoing objectives, the embodiments of the present invention adopt the following technical solutions.

According to a first aspect, the present invention provides an isolation method for a management virtual machine, including acquiring a guest identifier; searching, according to the guest identifier, the management virtual machine for a kernel virtual machine corresponding to the guest identifier; when the kernel virtual machine is not found in the management virtual machine, creating the kernel virtual machine in the management virtual machine; dividing a service provided for a guest virtual machine by the kernel virtual machine into multiple service components, where the guest virtual machine is a virtual machine corresponding to the guest identifier; and running the multiple service components in execution environments corresponding to permission of the service components, where the kernel virtual machine includes the multiple execution environments, and the multiple execution environments have different permission.

In a first possible implementation manner of the first aspect, when the kernel virtual machine is found in the management virtual machine, the method further includes acquiring, by the kernel virtual machine, an indication message sent by a virtual machine manager, where the indication message is sent to the virtual machine manager by the guest virtual machine, and is sent to the kernel virtual machine by the virtual machine manager after the virtual machine manager determines, according to the guest identifier carried in the indication message, the kernel virtual machine corresponding to the guest identifier, and the indication message is used to indicate a service required by the guest virtual machine; and responding, by the kernel virtual machine according to service request information carried in the indication message, to the service required by the guest virtual machine.

In a second possible implementation manner of the first aspect, the acquiring a guest identifier includes acquiring a request message, where the request message carries the guest identifier, and the request message is used to request to create the guest virtual machine; and acquiring the guest identifier from the request message; where the method further includes creating, according to the request message, the guest virtual machine corresponding to the guest identifier.

With reference to the first aspect or either of the first and the second possible implementation manners of the first aspect, in a third possible implementation manner, the dividing a service provided for a guest virtual machine by the kernel virtual machine into multiple service components includes dividing code of the service into multiple function code blocks according to a function of the kernel virtual machine; and running the multiple function code blocks in multiple service processes to form the multiple service components, where the multiple function code blocks are in a one-to-one correspondence with the multiple service processes.

With reference to the foregoing first aspect or any one of the first to the third possible implementation manners of the first aspect, in a fourth possible implementation manner, the running the multiple service components in execution environments corresponding to permission of the service components includes grouping the multiple service components according to the permission of the multiple service components, so that different groups of service components have different permission; and running the different groups of service components in the multiple service components in execution environments corresponding to the permission of the groups of service components.

With reference to the fourth possible implementation manner of the first aspect, in a fifth possible implementation manner, the permission of the multiple service components is determined by using the following method acquiring system parameters of the multiple service components; and determining, according to the system parameters of the multiple service components, the permission of the multiple service components that is corresponding to the system parameters of the multiple service components.

With reference to the foregoing first aspect or any one of the first to the fifth possible implementation manners of the first aspect, in a sixth possible implementation manner, after the running the multiple service components in execution environments corresponding to permission of the service components, the method further includes limiting the permission of the multiple service components according to a preset policy, where the preset policy includes at least one of an access operation and a control operation.

With reference to the foregoing first aspect or any one of the first to the sixth possible implementation manners of the first aspect, in a seventh possible implementation manner, after the running the multiple service components in execution environments corresponding to permission of the service components, the method further includes monitoring running states of the multiple service components; and when an error occurs in a running state of one service component in the multiple service components, re-enabling the one service component.

With reference to the foregoing first aspect or any one of the first to the seventh possible implementation manners of the first aspect, in an eighth possible implementation manner, after the running the multiple service components in execution environments corresponding to permission of the service components, the method further includes periodically re-enabling each of the multiple service components correspondingly according to a preset time, where the preset time is a preset time corresponding to each service component.

With reference to the first aspect or any one of the first to the eighth possible implementation manners of the first aspect, in a ninth possible implementation manner, the creating the kernel virtual machine in the management virtual machine includes creating, in the management virtual machine and according to a kernel virtualization technology, a kernel virtualization container corresponding to the guest identifier; and disposing, in the kernel virtualization container, a service provided for the guest virtual machine by the management virtual machine, to create the kernel virtual machine.

With reference to the first aspect or any one of the first to the ninth possible implementation manners of the first aspect, in a tenth possible implementation manner, a manner of communication between the multiple service components is interprocess communication.

With reference to the first aspect or any one of the first to the tenth possible implementation manners of the first aspect, in an eleventh possible implementation manner, the multiple service components include at least one of the following: a virtual machine enabling service component, a virtual machine management tool set component, a virtual machine device simulation component, a virtual machine creating tool component, a virtual machine back-end driver component, and a Xen storage component.

According to a second aspect, the present invention provides a management virtual machine, including an isolation module and at least one kernel virtual machine, where the isolation module is configured to acquire a guest identifier; search, according to the guest identifier, the at least one kernel virtual machine in the management virtual machine for a kernel virtual machine corresponding to the guest identifier; when the kernel virtual machine is not found in the at least one kernel virtual machine, create the kernel virtual machine in the management virtual machine; divide a service provided for a guest virtual machine by the kernel virtual machine into multiple service components, where the guest virtual machine is a virtual machine corresponding to the guest identifier; and run the multiple service components in execution environments corresponding to permission of the service components, where the kernel virtual machine includes the multiple execution environments, and the multiple execution environments have different permission.

In a first possible implementation manner of the second aspect, the kernel virtual machine is further configured to, when the isolation module finds the kernel virtual machine in the management virtual machine, acquire an indication message sent by a virtual machine manager, and respond, according to service request information carried in the indication message, with a service required by the guest virtual machine, where the indication message is sent to the virtual machine manager by the guest virtual machine, and is sent to the kernel virtual machine by the virtual machine manager after the virtual machine manager determines, according to the guest identifier carried in the indication message, the kernel virtual machine corresponding to the guest identifier, and the indication message is used to indicate the service required by the guest virtual machine.

In a second possible implementation manner of the second aspect, the isolation module is specifically configured to acquire a request message, acquire the guest identifier from the request message, and create, according to the request message, the guest virtual machine corresponding to the guest identifier, where the request message carries the guest identifier, and the request message is used to request to create the guest virtual machine.

With reference to the second aspect or either of the first and the second possible implementation manners of the second aspect, in a third possible implementation manner, the isolation module is specifically configured to divide code of the service into multiple function code blocks according to a function of the kernel virtual machine, and run the multiple function code blocks in multiple service processes to form the multiple service components, where the multiple function code blocks are in a one-to-one correspondence with the multiple service processes.

With reference to the second aspect or any one of the first to the third possible implementation manners of the second aspect, in a fourth possible implementation manner, the isolation module is specifically configured to group the multiple service components according to the permission of the multiple service components, so that different groups of service components have different permission; and run the different groups of service components in the multiple service components in execution environments corresponding to the permission of the groups of service components.

With reference to the fourth possible implementation manner of the second aspect, in a fifth possible implementation manner, the isolation module is further configured to acquire system parameters of the multiple service components, and determine, according to the system parameters of the multiple service components, the permission of the multiple service components that is corresponding to the system parameters of the multiple service components.

With reference to the second aspect or any one of the first to the fifth possible implementation manners of the second aspect, in a sixth possible implementation manner, the isolation module is further configured to, after running the multiple service components in the execution environments corresponding to the permission of the service components, limit the permission of the multiple service components according to a preset policy, where the preset policy includes at least one of an access operation and a control operation.

With reference to the second aspect or any one of the first to the sixth possible implementation manners of the second aspect, in a seventh possible implementation manner, the isolation module is further configured to, after running the multiple service components in the execution environments corresponding to the permission of the service components, monitor running states of the multiple service components, and when an error occurs in a running state of one service component in the multiple service components, re-enable the one service component.

With reference to the second aspect or any one of the first to the seventh possible implementation manners of the second aspect, in an eighth possible implementation manner, the isolation module is further configured to, after running the multiple service components in the execution environments corresponding to the permission of the service components, periodically re-enable each of the multiple service components correspondingly according to a preset time, where the preset time is a preset time corresponding to each service component.

With reference to the second aspect or any one of the first to the eighth possible implementation manners of the second aspect, in a ninth possible implementation manner, the isolation module is specifically configured to create, in the management virtual machine and according to a kernel virtualization technology, a kernel virtualization container corresponding to the guest identifier, and dispose, in the kernel virtualization container, a service provided for the guest virtual machine by the management virtual machine, to create the kernel virtual machine.

With reference to the second aspect or any one of the first to the ninth possible implementation manners of the second aspect, in a tenth possible implementation manner, a manner of communication between the multiple service components is interprocess communication.

With reference to the second aspect or any one of the first to the tenth possible implementation manners of the second aspect, in an eleventh possible implementation manner, the multiple service components include at least one of the following: a virtual machine enabling service component, a virtual machine management tool set component, a virtual machine device simulation component, a virtual machine creating tool component, a virtual machine back-end driver component, and a Xen storage component.

According to a third aspect, the present invention provides a server, where the management virtual machine according to the second aspect, and at least one guest virtual machine corresponding to each guest identifier run on the server, the management virtual machine includes a kernel virtual machine that is in a one-to-one correspondence with each guest identifier, and one kernel virtual machine provides a service for at least one guest virtual machine corresponding to one guest identifier.

According to the isolation method for a management virtual machine and the apparatus that are provided by the present invention, a guest identifier is acquired; the management virtual machine is searched, according to the guest identifier, for a kernel virtual machine corresponding to the guest identifier; when the kernel virtual machine is not found in the management virtual machine, the kernel virtual machine is created in the management virtual machine; a service provided for a guest virtual machine by the kernel virtual machine is divided into multiple service components, where the guest virtual machine is a virtual machine corresponding to the guest identifier; and the multiple service components are run in execution environments corresponding to permission of the service components, where the kernel virtual machine includes the multiple execution environments, and the multiple execution environments have different permission. According to this solution, a kernel virtual machine corresponding to each guest identifier may be created in a management virtual machine, and multiple service components provided for a guest virtual machine by a kernel virtual machine are run in execution environments corresponding to permission of the service components, so that longitudinal kernel virtualization layer isolation and lateral service layer isolation are performed on the management virtual machine. Therefore, service components that are corresponding to all guest identifiers and have different permission can still run in a same management virtual machine, thereby improving performance of communication between the service components, reducing resources required for running a virtual machine, and enhancing security of the service components.

DESCRIPTION OF EMBODIMENTS

An isolation method for a management virtual machine and an apparatus that are provided by the embodiments of the present invention are described below in detail with reference to the accompanying drawings.

According to an isolation method for a management virtual machine provided by an embodiment of the present invention, longitudinal kernel virtualization layer isolation and lateral service layer isolation are performed on the management virtual machine, so that in addition to that security of the management virtual machine is ensured, performance of communication between service components is improved, resources required for running a virtual machine is reduced, and security of the service components is enhanced.

Further, the isolation method for a management virtual machine provided by this embodiment of the present invention is implemented based on a server and on the management virtual machine. Therefore, the isolation method for a management virtual machine provided by this embodiment of the present invention may be executed by a server. The following embodiments all use a Xen virtualization system as an example, and use a server as an execution body, to describe in detail the isolation method for a management virtual machine provided by this embodiment of the present invention.

Embodiment 1

Figure 1:
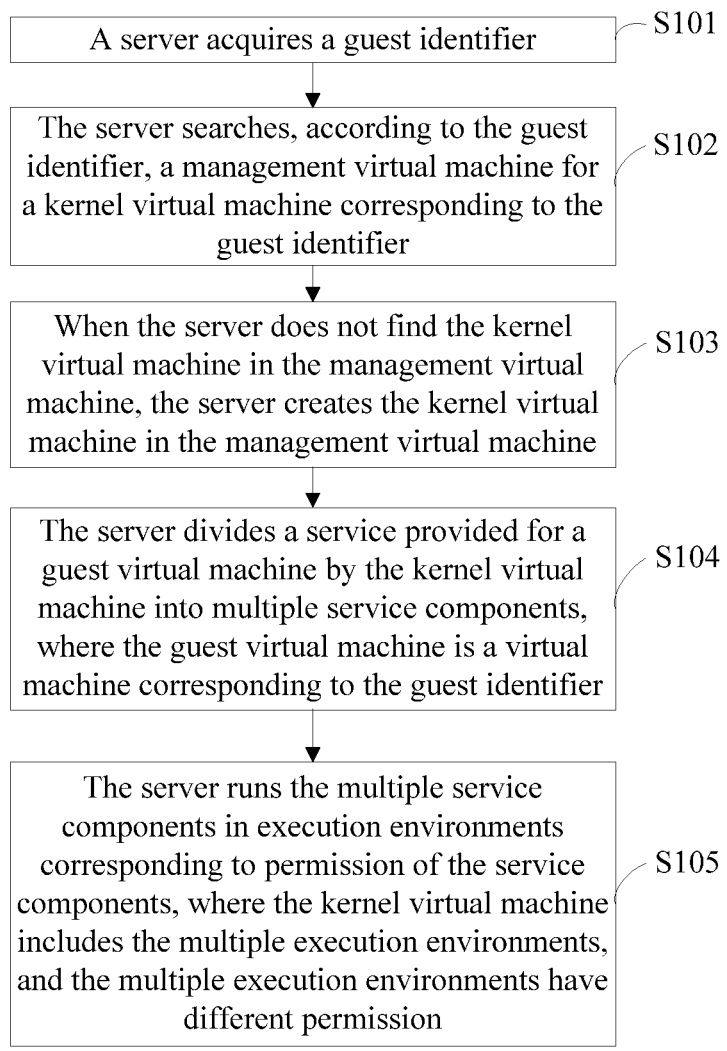
FIG. 1 is flowchart 1 of an isolation method for a management virtual machine according to an embodiment of the present invention.

This embodiment of the present invention provides an isolation method for a management virtual machine, and as shown in FIG. 1, the method may include:

S101: A server acquires a guest identifier.

Figure 2:
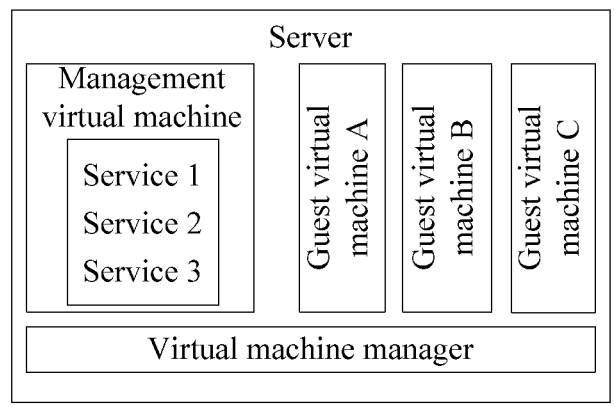
FIG. 2 is a schematic structural diagram of a server according to the prior art.

In the prior art, one server can implement one Xen virtualization system. As shown in FIG. 2, one virtual machine manager and at least one guest virtual machine that is corresponding to each guest identifier run on the server, where the virtual machine manager may be configured to manage multiple guest virtual machines. To reduce load of the virtual machine manager, a new virtual machine may be created and configured to assist the virtual machine manager in managing the multiple guest virtual machines, and the new virtual machine is called a management virtual machine, that is, a domain-0. The domain-0 is a complete Linux system, and is mainly responsible for creating a guest virtual machine, deleting a guest virtual machine, modifying a guest virtual machine, managing a guest virtual machine, and running a driver of an external device on the server. A service for all the guest virtual machines runs in the domain-0, and the service may be used to provide a basic service for these guest virtual machines, for example, a virtual machine enabling service, a virtual machine management service, a virtual machine device simulation service, a virtual machine creating tool service, a virtual machine back-end driver service, or a Xen storage service.

A service is a group of operations defined by an interface, and the interface can be invoked by another module.

Exemplarily, when a guest needs to create a guest virtual machine on a server, the guest may send a virtual machine creating request message to the server, so that after the server receives the virtual machine creating request message, the server may create a guest virtual machine on the server according to the virtual machine creating request message, where the virtual machine creating request message carries a guest identifier of the guest.

In particular, in this embodiment of the present invention, the guest may be considered as a user or tenant with a guest identifier, that is, one guest is corresponding to one guest identifier.

In this embodiment of the present invention, after the server receives the virtual machine creating request message, the server may acquire the guest identifier from the virtual machine creating request message, where the guest identifier may be an identity (ID) (serial number) of the guest. Specifically, the guest identifier may be an account possessed by the guest. For example, the guest identifier may be a login account for the guest to log on to a cloud computing platform.

S102: The server searches, according to the guest identifier, a management virtual machine for a kernel virtual machine corresponding to the guest identifier.

After the server acquires the guest identifier, the server may search, according to the guest identifier, the management virtual machine, that is, the domain-0, to determine whether the kernel virtual machine corresponding to the guest identifier exists.

S103: When the server does not find the kernel virtual machine in the management virtual machine, the server creates the kernel virtual machine in the management virtual machine.

After the server searches the domain-0 for the kernel virtual machine corresponding to the guest identifier, when the server does not find the kernel virtual machine in the domain-0, the server may create the kernel virtual machine in the domain-0.

It should be noted that the server may repeatedly execute the foregoing steps for different guest identifiers (which may also be considered as guests), that is, by using a kernel virtualization technology, the server may create, in the domain-0, kernel virtual machines corresponding to the different guest identifiers, to isolate services that are in the domain-0 and provided for guest virtual machines corresponding to the different guest identifiers.

Further, after the server creates the kernel virtual machine, the kernel virtual machine may provide a basic service for the guest virtual machine that the guest requests to create. It can be understood that after the server creates, in the domain-0, the different kernel virtual machines corresponding to the different guest identifiers, each kernel virtual machine may provide a basic service only for a guest virtual machine corresponding to a guest identifier corresponding to the kernel virtual machine. In this way, when a vulnerability occurs in a kernel virtual machine in the domain-0, only a guest virtual machine for which the kernel virtual machine provides a basic service is affected, and the other guest virtual machines, which are in the domain-0 and for which the other kernel virtual machines provide basic services, are not affected.

Further, the kernel virtual machine created in the domain-0 may provide the basic service for the guest virtual machine, so that when a guest requests to create on the server multiple guest virtual machines corresponding to a guest identifier of the guest, the server may create, in the domain-0, a kernel virtual machine corresponding to the guest identifier only when the guest requests to create a first guest virtual machine corresponding to the guest identifier; when the guest requests to create another guest virtual machine corresponding to the guest identifier, the server does not need to create, in the domain-0, another kernel virtual machine corresponding to the guest identifier, but needs to provide a basic service for the another guest virtual machine corresponding to the guest identifier only by using the created kernel virtual machine corresponding to the guest identifier. That is, one kernel virtual machine may provide a basic service for all guest virtual machines corresponding to one guest identifier, that is, one kernel virtual machine may provide a basic service for all guest virtual machines of one guest.

It can be understood that, in this embodiment of the present invention, one guest identifier is corresponding to one kernel virtual machine, the one guest identifier is corresponding to at least one guest virtual machine, and the one kernel virtual machine may provide a service for the at least one guest virtual machine.

At the point, the server performs longitudinal kernel virtualization layer isolation on the basic services that are in the domain-0 and provided for the guest virtual machines corresponding to the different guest identifiers.

S104: The server divides a service provided for a guest virtual machine by the kernel virtual machine into multiple service components, where the guest virtual machine is a virtual machine corresponding to the guest identifier.

After the server creates the kernel virtual machine in the domain-0, the server may divide the service provided for the guest virtual machine by the kernel virtual machine into the multiple service components, where the guest virtual machine is the virtual machine corresponding to the guest identifier.

Further, the server may divide the service into multiple different service components according to a function of the service provided for the guest virtual machine by the kernel virtual machine.

S105: The server runs the multiple service components in execution environments corresponding to permission of the service components, where the kernel virtual machine includes the multiple execution environments, and the multiple execution environments have different permission.

After the server divides the service provided for the guest virtual machine by the kernel virtual machine into the multiple service components, the server may run the multiple service components in the execution environments corresponding to the permission of the service components, that is, the server runs the service components with the different permission in the different execution environments, where the kernel virtual machine includes the multiple execution environments, and each execution environment in the multiple execution environments has different permission.

Figure 3:
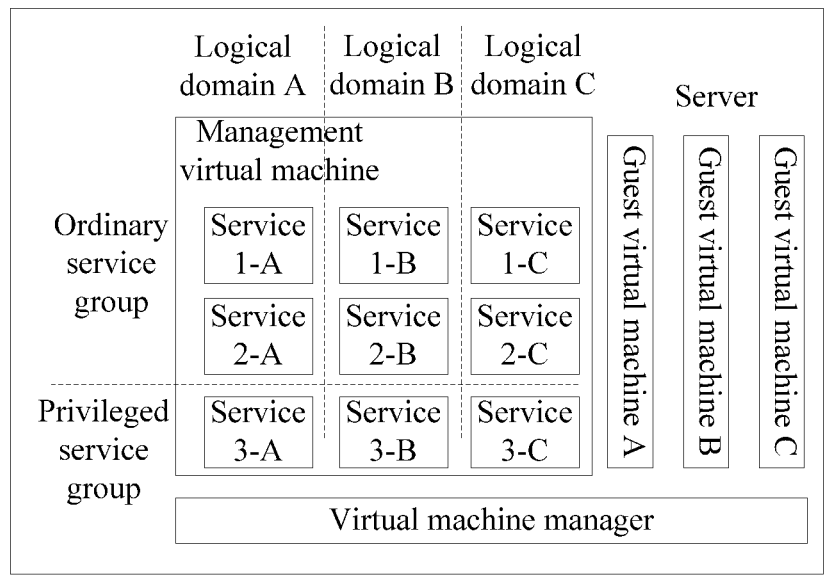
FIG. 3 is schematic structural diagram 1 of a server according to an embodiment of the present invention.

It should be noted that, as shown in FIG. 3, the isolation method for a management virtual machine provided by this embodiment of the present invention is implemented by creating two layers of virtual machines on a server and running multiple service components, which are in a domain-0 and provide basic services for guest virtual machines corresponding to different guest identifiers, in execution environments corresponding to permission of the service components, that is, first, the domain-0 is created on the server, and then kernel virtual machines for the different guest identifiers are created in the domain-0, and the multiple service components that provide the basic services and are of these kernel virtual machines are run in the execution environments corresponding to the permission of the service components, so that the different guest identifiers are corresponding to the different kernel virtual machines. Therefore, longitudinal kernel virtualization layer isolation is performed on the basic services provided for the guest virtual machines corresponding to the different guest identifiers, to form logical domains corresponding to the different guest identifiers, and lateral service layer isolation is performed on the multiple service components that provide the basic services, to form different service groups.

Exemplarily, as shown in FIG. 3, it is assumed that three guest virtual machines, which are guest virtual machine A, guest virtual machine B, and guest virtual machine C, run on the server that is provided by this embodiment of the present invention to implement a Xen virtualization system. According to the isolation method for a management virtual machine provided by this embodiment of the present invention, longitudinal kernel virtualization layer isolation is performed on basic services that are in the domain-0 and provided by all guest virtual machines corresponding to guest identifier A, all guest virtual machines corresponding to guest identifier B, and all guest virtual machines corresponding to guest identifier C, to form logical domain A corresponding to guest identifier A, logical domain B corresponding to guest identifier B, and logical domain C corresponding to guest identifier C; and lateral service layer isolation is performed on the multiple service components that provide the basic services, that is, the multiple service components are run in execution environments corresponding to permission of the service components, to form different service groups, such as a common service group and a privileged service group.

Optionally, in the isolation method for a management virtual machine provided by this embodiment of the present invention, an administrator with highest permission may instruct the server at any time to adjust, according to an actual demand, an execution environment in which any of the multiple service components runs, that is, the permission of the multiple service components is adjusted to re-isolate the multiple service components, which is not limited in the present invention.

According to the isolation method for a management virtual machine provided by this embodiment of the present invention, a guest identifier is acquired; the management virtual machine is searched, according to the guest identifier, for a kernel virtual machine corresponding to the guest identifier; when the kernel virtual machine is not found in the management virtual machine, the kernel virtual machine is created in the management virtual machine; a service provided for a guest virtual machine by the kernel virtual machine is divided into multiple service components, where the guest virtual machine is a virtual machine corresponding to the guest identifier; and the multiple service components are run in execution environments corresponding to permission of the service components, where the kernel virtual machine includes the multiple execution environments, and the multiple execution environments have different permission. According to this solution, a kernel virtual machine corresponding to each guest identifier may be created in a management virtual machine, and multiple service components provided for a guest virtual machine by a kernel virtual machine are run in execution environments corresponding to permission of the service components, so that longitudinal kernel virtualization layer isolation and lateral service layer isolation are performed on the management virtual machine. Therefore, service components that are corresponding to all guest identifiers and have different permission can still run in a same management virtual machine, thereby improving performance of communication between the service components, reducing resources required for running a virtual machine, and enhancing security of the service components.

Embodiment 2

Figure 4:
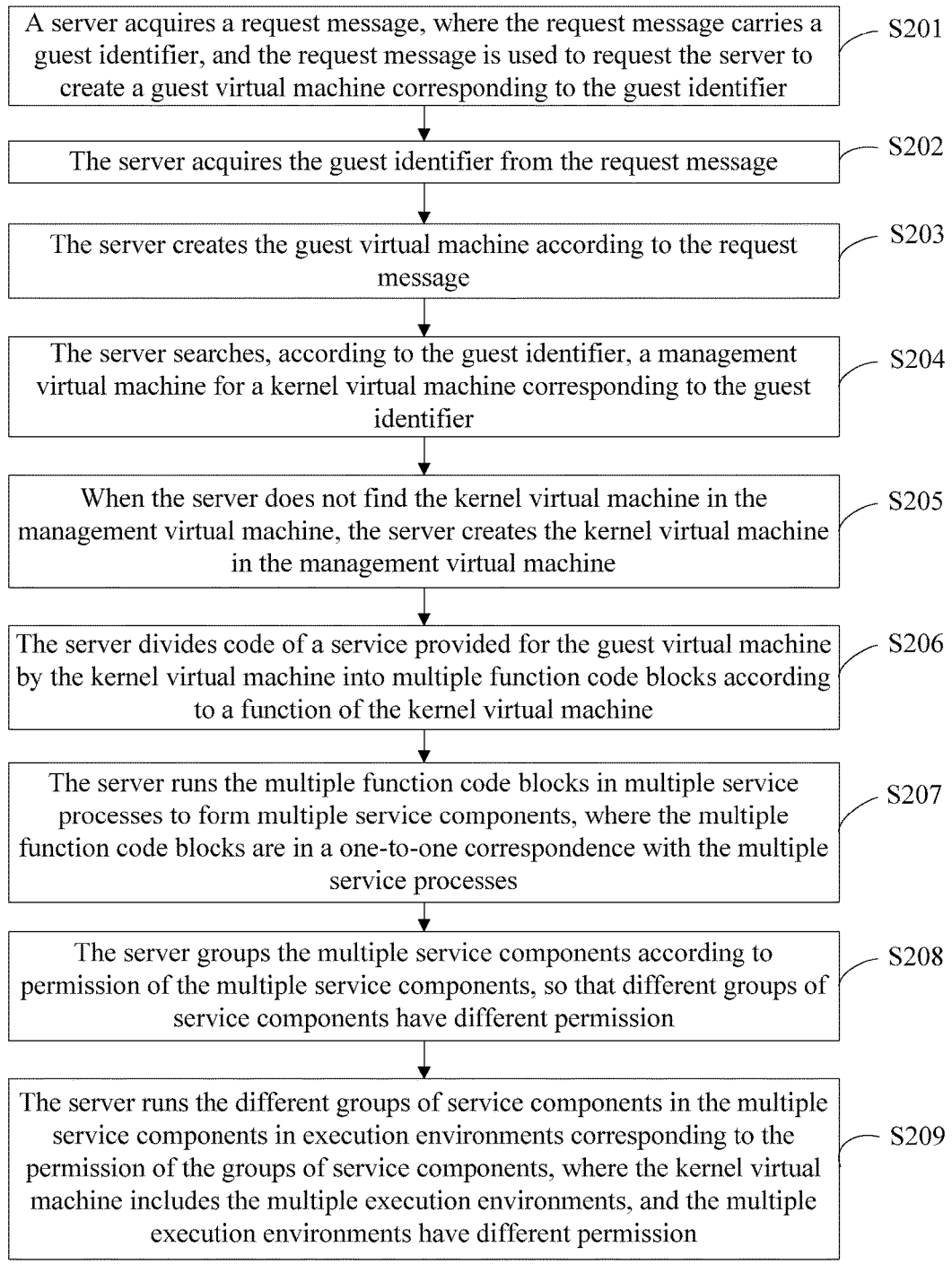
FIG. 4 is flowchart 2 of an isolation method for a management virtual machine according to an embodiment of the present invention.

This embodiment of the present invention provides an isolation method for a management virtual machine, and as shown in FIG. 4, the method may include:

S201: A server acquires a request message, where the request message carries a guest identifier, and the request message is used to request the server to create a guest virtual machine corresponding to the guest identifier.

In the prior art, one server can implement one Xen virtualization system. As shown in FIG. 2, one virtual machine manager and at least one guest virtual machine that is corresponding to each guest identifier run on the server, where the virtual machine manager may be configured to manage multiple guest virtual machines. To reduce load of the virtual machine manager, a new virtual machine may be created and configured to assist the virtual machine manager in managing the multiple guest virtual machines, and the new virtual machine is called a management virtual machine, that is, a domain-0. The domain-0 is a complete Linux system, and is mainly responsible for creating a guest virtual machine, deleting a guest virtual machine, modifying a guest virtual machine, managing a guest virtual machine, and running a driver of an external device on the server. A service for all the guest virtual machines runs in the domain-0, and the service may be used to provide a basic service for these guest virtual machines, for example, a virtual machine enabling service, a virtual machine management service, a virtual machine device simulation service, a virtual machine creating tool service, a virtual machine back-end driver service, or a Xen storage service.

A service is a group of operations defined by an interface, and the interface may be invoked by another module.

Exemplarily, when a guest needs to create a guest virtual machine on a server, the guest may send a request message, that is, a virtual machine creating request message, to the server, where the virtual machine creating request message carries a guest identifier, and the virtual machine creating request message may be used to request the server to create a guest virtual machine corresponding to the guest identifier.

In particular, in this embodiment of the present invention, the guest may be considered as a user or tenant with a guest identifier, that is, one guest is corresponding to one guest identifier.

S202: The server acquires the guest identifier from the request message.

After the server receives the request message, the server may acquire the guest identifier from the request message, where the guest identifier may be an ID of the guest. The guest identifier may be an account possessed by the guest. For example, the guest identifier may be a login account for the guest to log on to a cloud computing platform.

S203: The server creates the guest virtual machine according to the request message.

After the server receives the request message, the server may create a guest virtual machine on the server according to the request message, where the guest virtual machine is a virtual machine corresponding to the guest identifier.

It should be noted that the present invention sets no limitations on an execution sequence of S202 and S203, that is, the present invention may first execute S202, and then execute S203; or may first execute S203, and then execute S202; or may execute S202 and S203 simultaneously.

S204: The server searches, according to the guest identifier, a management virtual machine for a kernel virtual machine corresponding to the guest identifier.

After the server acquires the guest identifier, the server may search the management virtual machine, that is, the domain-0, according to the guest identifier to determine whether the kernel virtual machine corresponding to the guest identifier exists.

S205: When the server does not find the kernel virtual machine in the management virtual machine, the server creates the kernel virtual machine in the management virtual machine.

After the server searches the domain-0 for the kernel virtual machine corresponding to the guest identifier, when the server does not find the kernel virtual machine in the domain-0, the server may create the kernel virtual machine in the domain-0.

It should be noted that the server may repeatedly execute the foregoing steps for different guest identifiers (which may also be considered as guests), that is, by using a kernel virtualization technology, the server may create, in the domain-0, kernel virtual machines corresponding to the different guest identifiers, to isolate services that are in the domain-0 and provided for guest virtual machines corresponding to the different guest identifiers.

Further, after the server creates the kernel virtual machine, the kernel virtual machine may provide a basic service for the guest virtual machine the guest requests to create. It can be understood that after the server creates, in the domain-0, the different kernel virtual machines corresponding to the different guest identifiers, each kernel virtual machine may provide a basic service only for a guest virtual machine corresponding to a guest identifier corresponding to the kernel virtual machine. In this way, when a vulnerability occurs in a kernel virtual machine in the domain-0, only a guest virtual machine for which the kernel virtual machine provides a basic service is affected, and the other guest virtual machines, which are in the domain-0 and for which the other kernel virtual machines provide basic services, are not affected.

Further, the kernel virtual machine created in the domain-0 may provide the basic service for the guest virtual machine, so that when a guest requests to create on the server multiple guest virtual machines corresponding to a guest identifier of the guest, the server may create, in the domain-0, a kernel virtual machine corresponding to the guest identifier only when the guest requests to create a first guest virtual machine corresponding to the guest identifier; when the guest requests to create another guest virtual machine corresponding to the guest identifier, the server does not need to create, in the domain-0, another kernel virtual machine corresponding to the guest identifier, but needs to provide a basic service for the another guest virtual machine corresponding to the guest identifier only by using the created kernel virtual machine corresponding to the guest identifier. That is, one kernel virtual machine may provide a basic service for all guest virtual machines corresponding to one guest identifier, that is, one kernel virtual machine may provide a basic service for all guest virtual machines of one guest.

It can be understood that, in this embodiment of the present invention, one guest identifier is corresponding to one kernel virtual machine, the one guest identifier is corresponding to at least one guest virtual machine, and the one kernel virtual machine may provide a service for the at least one guest virtual machine.

A method used by the server to create the kernel virtual machine may include:

(1) The server creates, in the domain-0 and according to a kernel virtualization technology, a kernel virtualization container corresponding to the guest identifier.

(2) The server disposes, in the kernel virtualization container, a service that is in the domain-0 and provided for the guest virtual machine corresponding to the guest identifier, to create the kernel virtual machine.

In the isolation method for a management virtual machine provided by this embodiment of the present invention, the server may specifically isolate, by using a Linux Container (LXC) (a kernel virtualization technology) and by creating in the domain-0 the kernel virtual machines corresponding to the different guest identifiers, the services that are in the domain-0 and provided by the guest virtual machines corresponding to the different guest identifiers. The LXC is a lightweight kernel virtualization technology, and is implemented based on a cgroups (control groups) mechanism of a Linux system kernel. In this embodiment of the present invention, the server may use the LXC to logically divide and isolate the services that are in the domain-0 and provided for the guest virtual machines corresponding to the different guest identifiers, and perform resource allocation and management, to form logical domains corresponding to the different guest identifiers, where each logical domain is corresponding to one kernel virtual machine, one guest identifier, and at least one guest virtual machine corresponding to the one guest identifier.

Further, in this embodiment of the present invention, the server may use the LXC to create, in the domain-0, LXC containers corresponding to the different guest identifiers, and place the basic services that are in the domain-0 and provided for the guest virtual machines corresponding to the different guest identifiers into the corresponding LXC containers for isolation, so that the kernel virtual machines corresponding to the different guest identifiers are formed. In this way, a service that is in the domain-0 and required by a guest virtual machine corresponding to each guest identifier is constrained in a corresponding LXC container, so that the basic services that are in the domain-0 and provided for the guest virtual machines corresponding to the different guest identifiers may be effectively isolated by means of collaboration between the LXC container and a Xen virtualization system.

At the point, the server performs longitudinal kernel virtualization layer isolation on the basic services that are in the domain-0 and provided for the guest virtual machines corresponding to the different guest identifiers.

S206: The server divides code of a service provided for the guest virtual machine by the kernel virtual machine into multiple function code blocks according to a function of the kernel virtual machine.

After the server creates the kernel virtual machine, the server may divide, according to the function of the kernel virtual machine, the code of the service provided for the guest virtual machine by the kernel virtual machine into the multiple function code blocks.

S207: The server runs the multiple function code blocks in multiple service processes to form multiple service components, where the multiple function code blocks are in a one-to-one correspondence with the multiple service processes.

After the server divides the code of the service into the multiple function code blocks, the server may run the multiple function code blocks in the multiple service processes to form the multiple service components, where the multiple function code blocks are in the one-to-one correspondence with the multiple service processes.

In particular, in this embodiment of the present invention, a manner of communication between the multiple service components may be interprocess communication. In the prior art, a manner of communication between service components is inter-virtual machine communication, to ensure security of a domain-0. Compared with this manner, in this embodiment of the present invention, in addition to that security of the domain-0 is ensured, performance of communication between the service components can be improved by performing interprocess communication between the multiple service components.

Further, the multiple service components provided by this embodiment of the present invention may include at least one of the following: a virtual machine enabling service component, a virtual machine management tool set component, a virtual machine device simulation component, a virtual machine creating tool component, a virtual machine back-end driver component, and a Xen storage component.

S208: The server groups the multiple service components according to permission of the multiple service components, so that different groups of service components have different permission.

After the server forms the service provided for the guest virtual machine by the kernel virtual machine into the multiple service components, the server may group the multiple service components according to the permission of the multiple service components, so that the different groups, that is, the service components in the different groups, have the different permission, thereby implementing isolation between the multiple service components.

Optionally, the foregoing permission of the multiple service components may also be levels of the multiple service components or any other attribute that meets a grouping demand, which is not limited in the present invention.

Further, the permission of the multiple service components may include Root permission and common permission. The present invention does not set any limitations on a permission type of the multiple service components, and any permission type that can implement classification of the multiple service components falls within the protection scope of the present invention.

It should be noted that before the server groups the multiple service components according to the permission of the multiple service components, the server needs to determine the permission of the multiple service components. The permission of the multiple service components is determined by using the following method:

(1) The server acquires system parameters of the multiple service components.

(2) The server determines, according to the system parameters of the multiple service components, the permission of the multiple service components that is corresponding to the system parameters of the multiple service components.

Optionally, the system parameters of the multiple service components may include: functions of the multiple service components, system resources used by the multiple service components, or highest permission required by the multiple service components.

S209: The server runs the different groups of service components in the multiple service components in execution environments corresponding to the permission of the groups of service components, where the kernel virtual machine includes the multiple execution environments, and the multiple execution environments have different permission.

After the server groups the multiple service components, the server may run the different groups of service components in the service components in the execution environments corresponding to the permission of the groups of service components, that is, the server runs the groups of service components with the different permission in the different execution environments, where the kernel virtual machine includes the multiple execution environments, and the multiple execution environments have the different permission. Specifically, each execution environment in the multiple execution environments has different permission.

Exemplarily, when the server determines that permission of some service components is common permission, and permission of some other service components is privileged permission, the server may group these service components according to permission of these service components, and run some service components with the common permission, that is, some service components in a common service group, in a common execution environment, and run some other service components with the privileged permission, that is, some other service components in a privileged service group, in a privileged execution environment, so that service components with different permission may run in different execution environments. In this way, most of the service components may run in the common execution environment, and only a few of the service components may run in the privileged execution environment, so that a size of a Trusted Computing Base (TCB) (an entire protective apparatus within a computer) is reduced, thereby greatly reducing a probability of leaking the permission of the service components.

It should be noted that, as shown in FIG. 3, the isolation method for a management virtual machine provided by this embodiment of the present invention is implemented by creating two layers of virtual machines on a server and running multiple service components, which are in a domain-0 and provide basic services for guest virtual machines corresponding to different guest identifiers, in execution environments corresponding to permission of the service components, that is, first, the domain-0 is created on the server, and then kernel virtual machines for the different guest identifiers are created in the domain-0, and the multiple service components that provide the basic services and are of these kernel virtual machines are run in the execution environments corresponding to the permission of the service components, so that the different guest identifiers are corresponding to the different kernel virtual machines. Therefore, longitudinal kernel virtualization layer isolation is performed on the basic services provided for the guest virtual machines corresponding to the different guest identifiers, to form logical domains corresponding to the different guest identifiers, and lateral service layer isolation is performed on the multiple service components that provide the basic services, to form different service groups.

Exemplarily, as shown in FIG. 3, it is assumed that three guest virtual machines, which are guest virtual machine A, guest virtual machine B, and guest virtual machine C, run on the server that is provided by this embodiment of the present invention to implement a Xen virtualization system. According to the isolation method for a management virtual machine provided by this embodiment of the present invention, longitudinal kernel virtualization layer isolation is performed on basic services that are in the domain-0 and provided by all guest virtual machines corresponding to guest identifier A, all guest virtual machines corresponding to guest identifier B, and all guest virtual machines corresponding to guest identifier C, to form logical domain A corresponding to guest identifier A, logical domain B corresponding to guest identifier B, and logical domain C corresponding to guest identifier C; and lateral service layer isolation is performed on the multiple service components that provide the basic services, that is, the multiple service components are run in execution environments corresponding to permission of the service components, to form different service groups, such as a common service group and a privileged service group.

Optionally, in the isolation method for a management virtual machine provided by this embodiment of the present invention, an administrator with highest permission may instruct the server at any time to adjust, according to an actual demand, an execution environment in which any of the multiple service components runs, that is, the permission of the multiple service components is adjusted to re-isolate the multiple service components, which is not limited in the present invention.

Figure 5A:
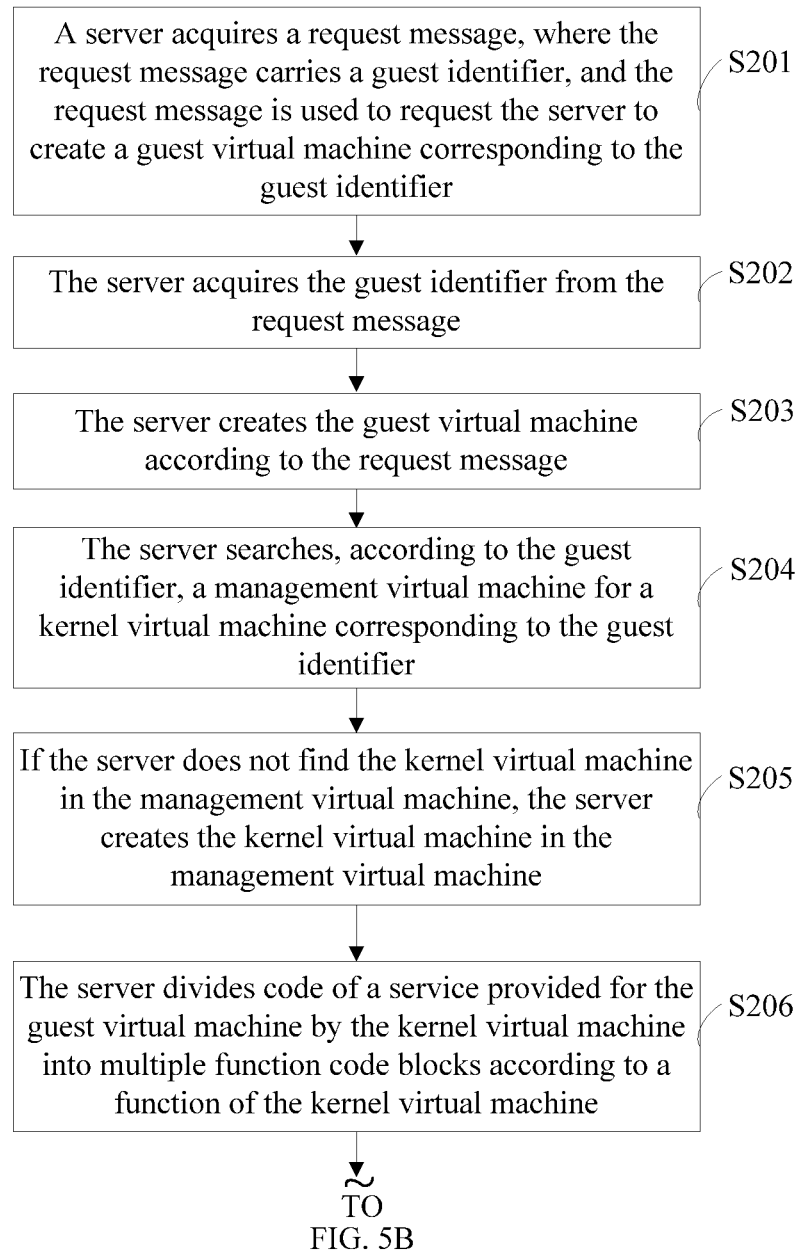
FIG. 5A and FIG. 5B are flowchart 3 of an isolation method for a management virtual machine according to an embodiment of the present invention.
Figure 5B:
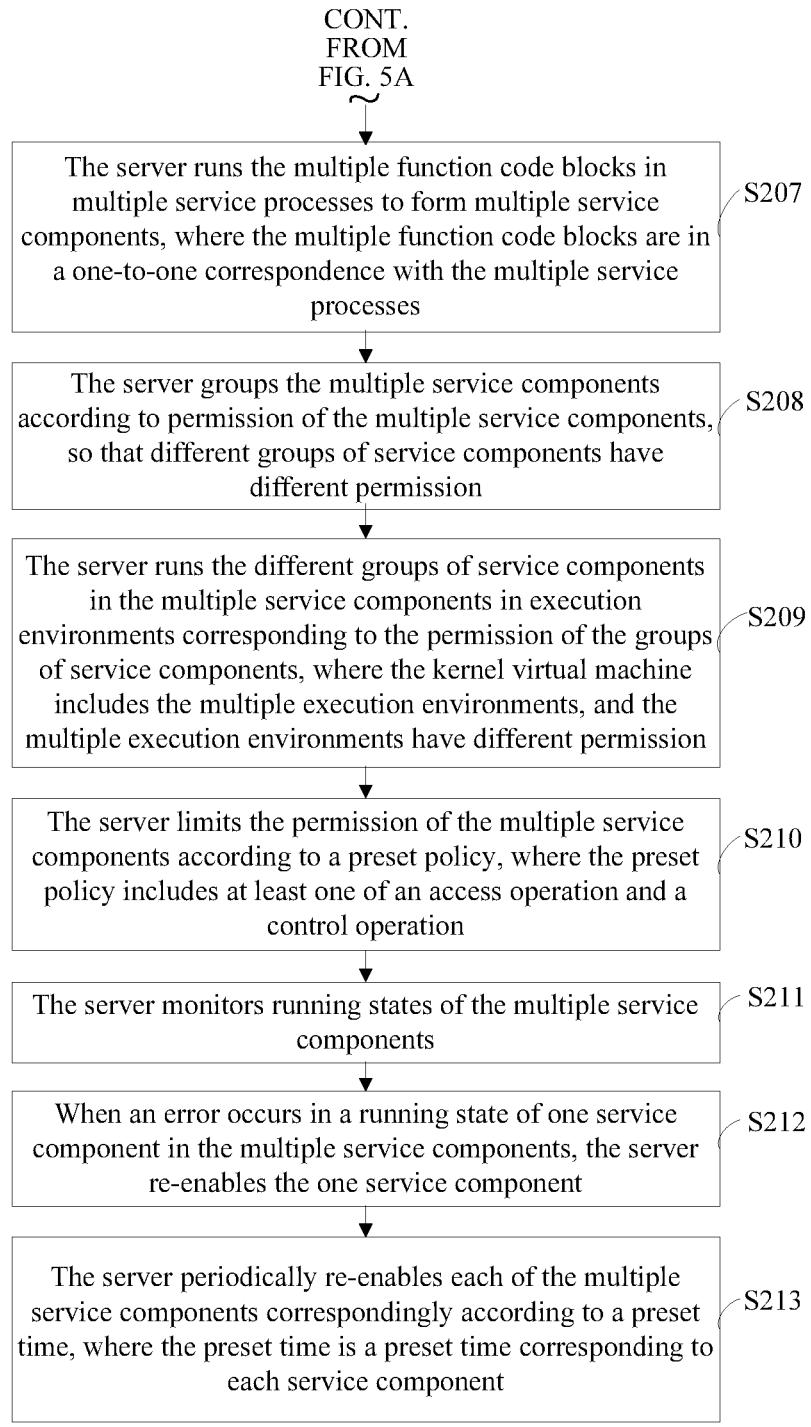

Optionally, as shown in FIG. 5, in the isolation method for a management virtual machine provided by this embodiment of the present invention, after S209, that is, after the server runs the different groups of service components in the multiple service components in execution environments corresponding to the permission of the groups of service components, the method further includes:

S210: The server limits the permission of the multiple service components according to a preset policy, where the preset policy includes at least one of an access operation and a control operation.

After the server runs the multiple service components in the execution environments corresponding to the permission of the service components, the server may further limit the permission of the multiple service components, that is, the server may further limit the permission of the multiple service components according to the preset policy.

The preset policy may be a policy control method, where the policy control method may specifically include at least one of the access operation and the control operation, and the policy control method may be implemented in a software manner according to an actual demand, which is not limited in the present invention.

The access operation may be at least one of a read operation, a write operation, an insert operation, a delete operation, a modify operation, and the like; and the control operation may be at least one of a close operation, an open operation, and the like. For example, the foregoing access operation may be set for a service component to further limit access permission of the service component; and the foregoing control operation may also be set for the service component to further limit control permission of the service component.

Exemplarily, the server may further limit the permission of the multiple service components by using the policy control method provided by this embodiment of the present invention, for example, the server may further limit access operations of some of the multiple service components in a software manner.

S211: The server monitors running states of the multiple service components.

After the server runs the multiple service components in the execution environments corresponding to the permission of the service components, the server may monitor the running states of the multiple service components.

S212: When an error occurs in a running state of one service component in the multiple service components, the server re-enables the one service component.

During a process in which the server monitors the multiple service components, when the error occurs in a running state of one service component in the multiple service components, the server may re-enable the one service component.

It should be noted that the present invention sets no limitations on an execution sequence of S210 and S211 to S212, that is, the present invention may first execute S210, and then execute S211 to S212; or may first execute S211 to S212, and then execute S210; or may execute S210 and S211 to S212 simultaneously.

S213: The server periodically re-enables each of the multiple service components correspondingly according to a preset time, where the preset time is a preset time corresponding to each service component.

During a process in which the server runs the multiple service components, the server may periodically re-enable each of the multiple service components correspondingly according to a preset time, where the preset time is the preset time corresponding to each service component.

A re-enable period, that is, the foregoing preset time, may be set for the multiple service components; or, a preset time may be set for some of the multiple service components, and a preset time may be set for the other service components of the multiple service components; or, a preset time may be set for each of the multiple service components, so that the server may periodically re-enable each of the multiple service components correspondingly according to these preset times.

It can be understood that at least one preset time may be set for the multiple service components, so that the server may periodically re-enable each of the multiple service components correspondingly according to the at least one preset time.

Exemplarily, it is assumed a re-enable period set for a service component is one month. Therefore, the server may regularly re-enable the service component by using one month as a period.

It should be noted that after the server runs the multiple service components in the execution environments corresponding to the permission of the service components, the server may repeatedly execute S213 during running processes of the multiple service components.

In the isolation method for a management virtual machine provided by this embodiment of the present invention, when some service components in the domain-0 do not need to run for a long time, these service components may be disabled when they are not in use, so that an external service interface of the domain-0 can be further limited, thereby reducing an attack range and increasing attack difficulty.

Figure 6A:
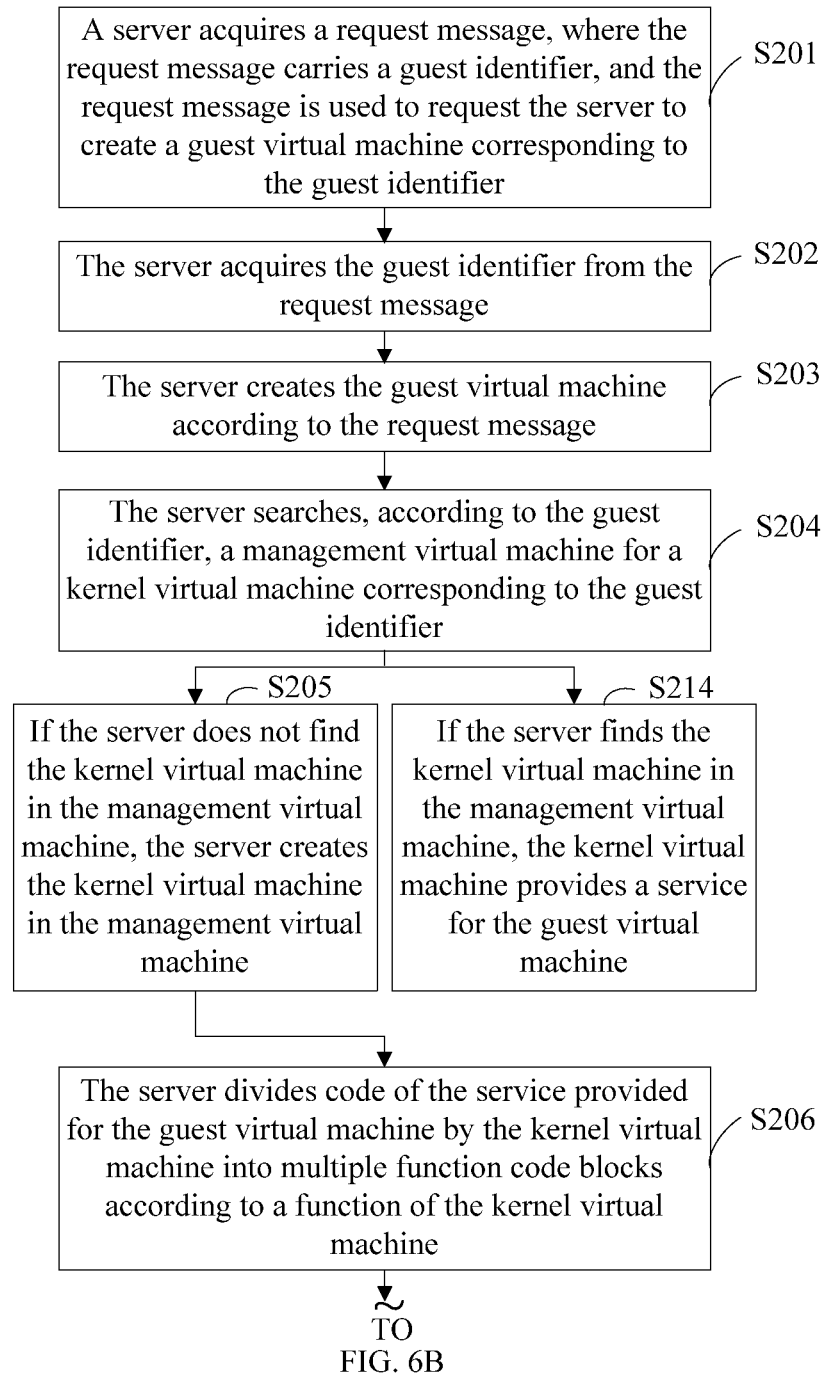
FIG. 6A and FIG. 6B are flowchart 4 of an isolation method for a management virtual machine according to an embodiment of the present invention.
Figure 6B:
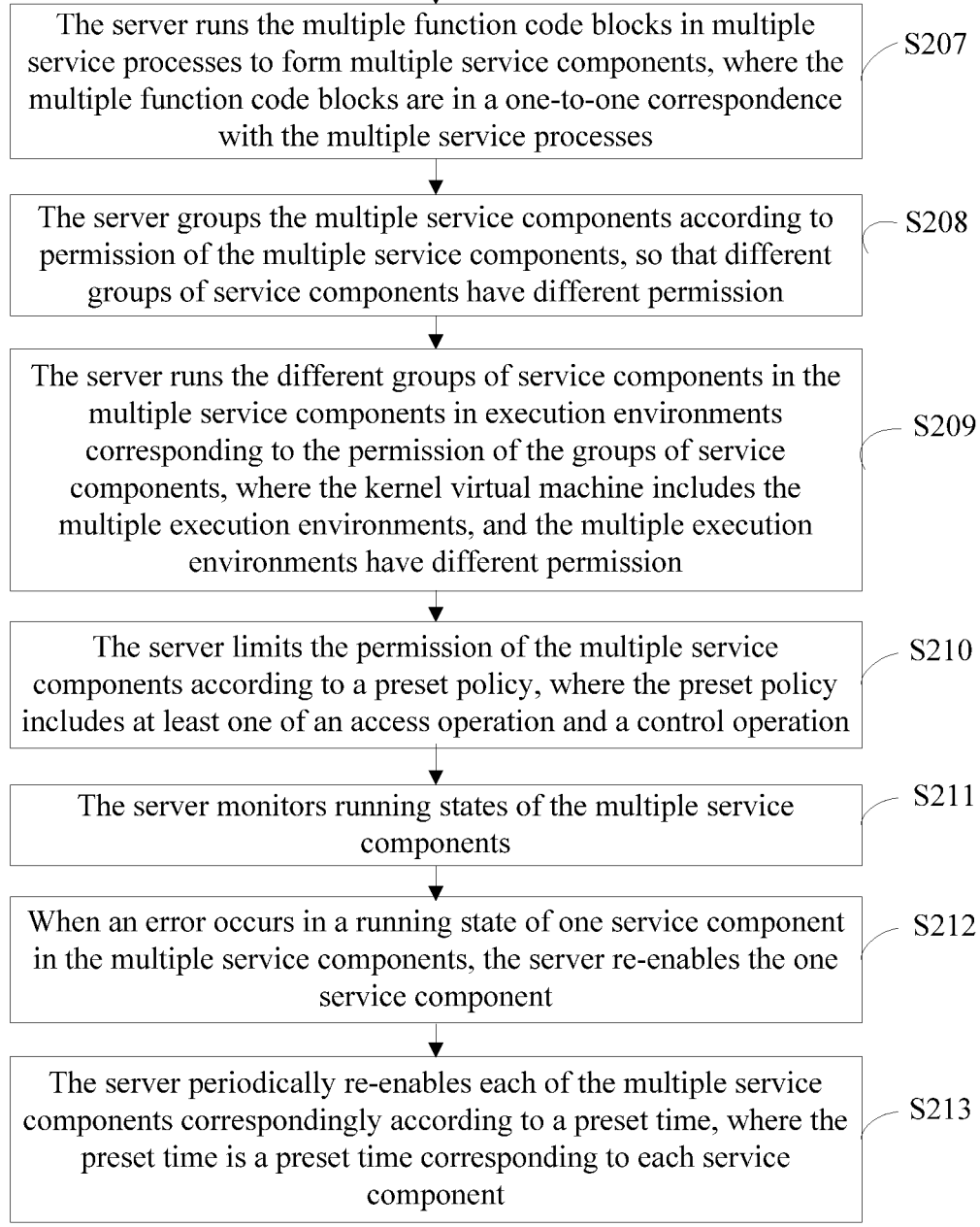

Further, as shown in FIG. 6, after the server searches the management virtual machine for the kernel virtual machine, that is, after S204, the isolation method for a management virtual machine provided by this embodiment of the present invention may further include:

S214: When the server finds the kernel virtual machine in the management virtual machine, the kernel virtual machine provides a service for the guest virtual machine.

After the server searches the management virtual machine for the kernel virtual machine, when the server finds the kernel virtual machine in the management virtual machine, the kernel virtual machine may provide the service for the guest virtual machine.

It can be understood that when the server finds the kernel virtual machine in the management virtual machine, the server may determine that the kernel virtual machine corresponding to the guest identifier has been created in the management virtual machine, that is, the server may not need to create, in the management virtual machine, the kernel virtual machine corresponding to the guest identifier again, and service components that have different permission and are in the kernel virtual machine may directly provide the service for the guest virtual machine.

After the server finds, in the management virtual machine, the kernel virtual machine corresponding to the guest identifier, a method used by the kernel virtual machine to provide a service for the guest virtual machine may include:

(1) The kernel virtual machine acquires an indication message sent by the management virtual machine, where the indication message is sent to a virtual machine manager by the guest virtual machine, and is sent to the kernel virtual machine by the virtual machine manager after the virtual machine manager determines, according to the guest identifier carried in the indication message, the kernel virtual machine corresponding to the guest identifier, where the indication message may be used to indicate a service required by the guest virtual machine.

(2) The kernel virtual machine responds, according to service request information carried in the indication message, to the service required by the guest virtual machine.

In particular, according to the isolation method for a management virtual machine provided by this embodiment of the present invention, with respect to implementation inside the server, the virtual machine manager is a component that manages all virtual machines that run in server. Therefore, the virtual machine manager has a scheduling function. After the server creates a new guest virtual machine according to a request of a guest, the guest virtual machine may request a corresponding kernel virtual machine to provide the guest virtual machine with a service required by the guest virtual machine, that is, the guest virtual machine may send to the virtual machine manager an indication message used to indicate the service required by the guest virtual machine. After the virtual machine manager receives the indication message sent by the guest virtual machine, the virtual machine manager may acquire a guest identifier corresponding to the guest virtual machine from the indication message, find, in the management virtual machine and according to the guest identifier, the kernel virtual machine corresponding to the guest identifier, and send the indication message to the kernel virtual machine, so that the kernel virtual machine responds, according to service request information carried in the indication message, to the service required by the guest virtual machine, that is, the kernel virtual machine provides, according to the service request information carried in the indication message, the guest virtual machine with the service required by the guest virtual machine.

For example, when the guest virtual machine needs to access a magnetic disk, the guest virtual machine may send to the virtual machine manager an indication message that indicates accessing the magnetic disk, and the virtual machine manager sends the indication message to a corresponding kernel virtual machine, where the kernel virtual machine may access the magnetic disk according to the indication message, and return a result of accessing the magnetic disk to the guest virtual machine, to respond to a magnetic disk accessing service required by the guest virtual machine. The kernel virtual machine may specifically respond, by using a corresponding service component in the foregoing multiple service components, to the magnetic disk accessing service required by the guest virtual machine.

Further, after the server finds the kernel virtual machine in the management virtual machine, the server may re-adjust, according to an instruction from an administrator, an execution environment in which any of the multiple service components in the kernel virtual machine runs, that is, the server may re-adjust the permission of the multiple service components, and provide the service for the guest virtual machine by using the multiple service components with re-adjusted permission that are in the kernel virtual machine.

It should be noted that in the Xen virtualization system, vulnerabilities that currently occur on a Common Vulnerabilities and Exposures (CVE) mainly include: CVE-2007-4993, CVE-2007-5497, CVE-2008-0923, CVE-2008-1943, CVE-2008-2100, CVE-2011-3262, CVE-2012-4544, and the like.

Exemplarily, the following uses three vulnerabilities as examples to further describe the isolation method for a management virtual machine provided by this embodiment of the present invention.

(1) CVE-2011-3262 indicates that a vulnerability is found in code of a virtual machine enabling service of Xen 3.2, 3.3, 4.0, and 4.1. The vulnerability is that proper loop bounds-checking is not performed when a compressed file of a guest virtual machine kernel is decompressed, so that a local guest may use the vulnerability to enable the virtual machine enabling service to fall into an infinite loop, to implement a Deny of Service (DoS) (denial of service attack).

(2) CVE-2012-4544 indicates that a paravirtualized virtual machine generator does not detect sizes of a kernel and a Ramdisk, so that when mirroring of a malicious guest virtual machine is enabled, extremely large memory consumption of a domain-0 results in DoS.

(3) CVE-2007-4993 indicates that a vulnerability exists in a grub enabling program of Xen 3.0.3, so that a malicious guest virtual machine may execute in a domain-0 any instruction.

For the vulnerabilities indicated in the foregoing (1), (2), and (3), by using the isolation method for a management virtual machine provided by this embodiment of the present invention, the basic services (including a virtual machine enabling service), which are in the domain-0 and provided for the guest virtual machines corresponding to the different guest identifiers, may be disposed into different virtualization containers, so that when the foregoing vulnerabilities occur in an enabling service of a guest virtual machine corresponding to a guest identifier, only the guest virtual machine is affected, and other guest virtual machines are not affected, thereby ensuring the security of the domain-0.

Further, in the isolation method for a management virtual machine provided by this embodiment of the present invention, the server may monitor running states of the foregoing basic services in real time. When the server detects that an error occurs in a service component in the basic services, for example, the virtual machine enabling service in the foregoing (1) falls into the infinite loop, the server may disable the service component, or re-enable the service component, to ensure normal running of the entire Xen virtualization system.

According to the isolation method for a management virtual machine provided by this embodiment of the present invention, a guest identifier is acquired; the management virtual machine is searched, according to the guest identifier, for a kernel virtual machine corresponding to the guest identifier; when the kernel virtual machine is not found in the management virtual machine, the kernel virtual machine is created in the management virtual machine; a service provided for a guest virtual machine by the kernel virtual machine is divided into multiple service components, where the guest virtual machine is a virtual machine corresponding to the guest identifier; and the multiple service components are run in execution environments corresponding to permission of the service components, where the kernel virtual machine includes the multiple execution environments, and the multiple execution environments have different permission. According to this solution, a kernel virtual machine corresponding to each guest identifier may be created in a management virtual machine, and multiple service components provided for a guest virtual machine by a kernel virtual machine are run in execution environments corresponding to permission of the service components, so that longitudinal kernel virtualization layer isolation and lateral service layer isolation are performed on the management virtual machine. Therefore, service components that are corresponding to all guest identifiers and have different permission can still run in a same management virtual machine, thereby improving performance of communication between the service components, reducing resources required for running a virtual machine, and enhancing security of the service components.

Embodiment 3

Figure 7:
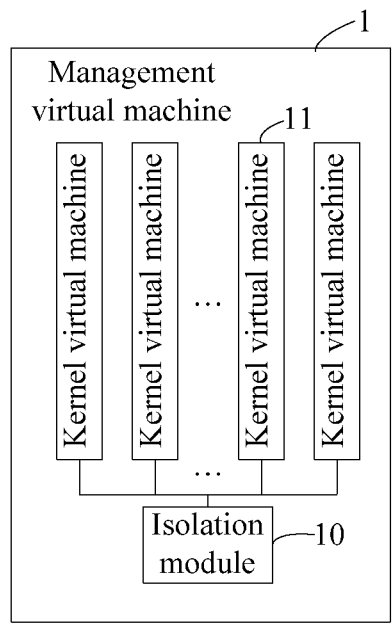
FIG. 7 is a schematic structural diagram of a management virtual machine according to an embodiment of the present invention.

As shown in FIG. 7, this embodiment of the present invention provides a management virtual machine 1, where the management virtual machine 1 may include an isolation module 10 and at least one kernel virtual machine 11, and the isolation module 10 is configured to acquire a guest identifier; search, according to the guest identifier, the at least one kernel virtual machine 11 in the management virtual machine 1 for a kernel virtual machine 11 corresponding to the guest identifier; when the kernel virtual machine 11 is not found in the at least one kernel virtual machine 11, create the kernel virtual machine 11 in the management virtual machine 1; divide a service provided for a guest virtual machine by the kernel virtual machine 11 into multiple service components, where the guest virtual machine is a virtual machine corresponding to the guest identifier; and run the multiple service components in execution environments corresponding to permission of the service components, where the kernel virtual machine 11 includes the multiple execution environments, and the multiple execution environments have different permission.

Further, the kernel virtual machine 11 is further configured to, when the isolation module 10 finds the kernel virtual machine 11 in the management virtual machine 1, acquire an indication message sent by a virtual machine manager, and respond, according to service request information carried in the indication message, with a service required by the guest virtual machine, where the indication message is sent to the virtual machine manager by the guest virtual machine, and is sent to the kernel virtual machine 11 by the virtual machine manager after the virtual machine manager determines, according to the guest identifier carried in the indication message, the kernel virtual machine 11 corresponding to the guest identifier, and the indication message is used to indicate the service required by the guest virtual machine.

Optionally, the isolation module 10 is specifically configured to acquire a request message, acquire the guest identifier from the request message, and create, according to the request message, the guest virtual machine corresponding to the guest identifier, where the request message carries the guest identifier, and the request message is used to request to create the guest virtual machine.

Optionally, the isolation module 10 is specifically configured to divide code of the service into multiple function code blocks according to a function of the kernel virtual machine 11, and run the multiple function code blocks in multiple service processes to form the multiple service components, where the multiple function code blocks are in a one-to-one correspondence with the multiple service processes.

Optionally, the isolation module 10 is specifically configured to group the multiple service components according to the permission of the multiple service components, so that different groups of service components have different permission; and run the different groups of service components in the multiple service components in execution environments corresponding to the permission of the groups of service components.

Further, the isolation module 10 is further configured to acquire system parameters of the multiple service components, and determine, according to the system parameters of the multiple service components, the permission of the multiple service components that is corresponding to the system parameters of the multiple service components.

Further, the isolation module 10 is further configured to, after running the multiple service components in the execution environments corresponding to the permission of the service components, limit the permission of the multiple service components according to a preset policy, where the preset policy includes at least one of an access operation and a control operation.

Further, the isolation module 10 is further configured to, after running the multiple service components in the execution environments corresponding to the permission of the service components, monitor running states of the multiple service components, and when an error occurs in a running state of one service component in the multiple service components, re-enable the one service component.

Further, the isolation module 10 is further configured to, after running the multiple service components in the execution environments corresponding to the permission of the service components, periodically re-enable each of the multiple service components correspondingly according to a preset time, where the preset time is a preset time corresponding to each service component.

Optionally, the isolation module 10 is specifically configured to create, in the management virtual machine 1 and according to a kernel virtualization technology, a kernel virtualization container corresponding to the guest identifier, and dispose, in the kernel virtualization container, a service provided for the guest virtual machine by the management virtual machine 1, to create the kernel virtual machine 11.

Optionally, a manner of communication between the multiple service components may be interprocess communication.

Optionally, the multiple service components may include at least one of the following: a virtual machine enabling service component, a virtual machine management tool set component, a virtual machine device simulation component, a virtual machine creating tool component, a virtual machine back-end driver component, and a Xen storage component.

The management virtual machine provided by this embodiment of the present invention may run on a server. One virtual machine manager and at least one guest virtual machine that is corresponding to each guest identifier also run on the server. The management virtual machine includes a kernel virtual machine that is in a one-to-one correspondence with each guest identifier, and one kernel virtual machine provides a service for at least one guest virtual machine corresponding to one guest identifier.

This embodiment of the present invention provides a management virtual machine. The management virtual machine acquires a guest identifier; searches, according to the guest identifier, at least one kernel virtual machine in the management virtual machine for a kernel virtual machine corresponding to the guest identifier; when the management virtual machine does not find the kernel virtual machine in the at least one kernel virtual machine, the management virtual machine creates the kernel virtual machine in the management virtual machine; the management virtual machine divides a service provided for a guest virtual machine by the kernel virtual machine into multiple service components, where the guest virtual machine is a virtual machine corresponding to the guest identifier; and the management virtual machine runs the multiple service components in execution environments corresponding to permission of the multiple service components, where the kernel virtual machine includes the multiple execution environments, and the multiple execution environments have different permission. According to this solution, a kernel virtual machine corresponding to each guest identifier may be created in a management virtual machine, and multiple service components provided for a guest virtual machine by a kernel virtual machine are run in execution environments corresponding to permission of the service components, so that longitudinal kernel virtualization layer isolation and lateral service layer isolation are performed on the management virtual machine. Therefore, service components that are corresponding to all guest identifiers and have different permission can still run in a same management virtual machine, thereby improving performance of communication between the service components, reducing resources required for running a virtual machine, and enhancing security of the service components.

Embodiment 4

Figure 8:
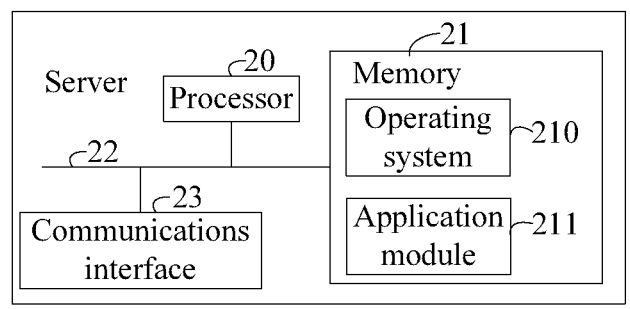
FIG. 8 is schematic structural diagram 2 of a server according to an embodiment of the present invention.

As shown in FIG. 8, this embodiment of the present invention provides a server, where the server may include a processor 20, a memory 21, a system bus 22, and a communications interface 23. The processor 20, the memory 21, and the communications interface 23 are connected to and communicate with each other by using the system bus 22. One virtual machine manager, one management virtual machine according to the foregoing embodiment, and at least one guest virtual machine corresponding to each guest identifier run on the processor 20 of the server, where the virtual machine manager is configured to manage the management virtual machine and these guest virtual machines, the management virtual machine includes a kernel virtual machine that is in a one-to-one correspondence with each guest identifier, and one kernel virtual machine provides a service for at least one guest virtual machine corresponding to one guest identifier.

The processor 20 may be a single-core or a multi-core central processing unit, or an application-specific integrated circuit, or one or more integrated circuits that are configured to implement this embodiment of the present invention.

The memory 21 may be a high-speed random access memory (RAM), or may be a non-volatile memory, such as at least one magnetic disk memory.

The memory 21 is configured to store the following elements: an executable module or a data structure, or their subsets, or their extended sets, and a computer-executed instruction; an operating system 210, which includes a variety of system programs and is configured to implement a variety of basic services and process a hardware-based task; and an application module 211, which includes a variety of applications and is configured to implement a variety of application services.

The application module 211 includes, but is not limited to, a virtual machine operating system.

When the server runs, the processor 20 runs the computer-executed instruction, and may execute the method in FIG. 1 or in any one of FIG. 4 to FIG. 6, which includes:

The processor 20 is configured to acquire a guest identifier from the communications interface 23 by using the system bus 22; search, according to the guest identifier and by using the system bus 22, at least one kernel virtual machine in the management virtual machine for a kernel virtual machine corresponding to the guest identifier; when the kernel virtual machine is not found in the at least one kernel virtual machine, create the kernel virtual machine in the management virtual machine; divide a service provided for a guest virtual machine by the created kernel virtual machine into multiple service components, where the guest virtual machine is a virtual machine corresponding to the guest identifier; and run the multiple service components in execution environments corresponding to permission of the service components, where the kernel virtual machine includes the multiple execution environments, and the multiple execution environments have different permission; and the memory 21 is configured to store the guest identifier, software code of the multiple service components, and a software program that controls the processor 20 to implement the forgoing process, so that the processor 20 implements the foregoing process by executing the software program and by invoking the software code.

Further, the processor 20 is further configured to, when the kernel virtual machine is found in the management virtual machine, acquire an indication message sent by the virtual machine manager, and respond, according to service request information carried in the indication message, with a service required by the guest virtual machine, where the indication message is sent to the virtual machine manager by the guest virtual machine, and is sent to the processor 20 by the virtual machine manager after the virtual machine manager determines, according to the guest identifier carried in the indication message, the kernel virtual machine corresponding to the guest identifier, and the indication message is used to indicate the service required by the guest virtual machine.

Optionally, the processor 20 is specifically configured to acquire a request message from the communications interface 23 by using the system bus 22, acquire the guest identifier from the request message, and create, according to the request message, the guest virtual machine corresponding to the guest identifier, where the request message carries the guest identifier, and the request message is used to request to create the guest virtual machine.

Optionally, the processor 20 is specifically configured to divide code of the service into multiple function code blocks according to a function of the kernel virtual machine, and run the multiple function code blocks in multiple service processes to form the multiple service components, where the multiple function code blocks are in a one-to-one correspondence with the multiple service processes.

Optionally, the processor 20 is specifically configured to group the multiple service components according to the permission of the multiple service components, so that different groups of service components have different permission; and run the different groups of service components in the multiple service components in execution environments corresponding to the permission of the groups of service components.

Further, the processor 20 is further configured to acquire system parameters of the multiple service components by using the system bus 22, and determine, according to the system parameters of the multiple service components, the permission of the multiple service components that is corresponding to the system parameters of the multiple service components.

Further, the processor 20 is further configured to, after running the multiple service components in the execution environments corresponding to the permission of the service components, limit the permission of the multiple service components according to a preset policy, where the preset policy includes at least one of an access operation and a control operation.

Further, the processor 20 is further configured to, after running the multiple service components in the execution environments corresponding to the permission of the service components, monitor running states of the multiple service components by using the system bus 22, and when an error occurs in a running state of one service component in the multiple service components, re-enable the one service component.

Further, the processor 20 is further configured to, after running the multiple service components in the execution environments corresponding to the permission of the service components, periodically re-enable each of the multiple service components correspondingly according to a preset time, where the preset time is a preset time corresponding to each service component.

Optionally, the processor 20 is specifically configured to create, in the management virtual machine, according to a kernel virtualization technology, and by using the system bus 22, a kernel virtualization container corresponding to the guest identifier, and dispose, in the kernel virtualization container, a service provided for the guest virtual machine by the management virtual machine, to create the kernel virtual machine.

Optionally, a manner of communication between the multiple service components may be interprocess communication.

Optionally, the multiple service components may include at least one of the following: a virtual machine enabling service component, a virtual machine management tool set component, a virtual machine device simulation component, a virtual machine creating tool component, a virtual machine back-end driver component, and a Xen storage component.

This embodiment of the present invention provides a server. The server acquires a guest identifier, and searches, according to the guest identifier, at least one kernel virtual machine in the management virtual machine for a kernel virtual machine corresponding to the guest identifier; when the server does not find the kernel virtual machine in the at least one kernel virtual machine, the server creates the kernel virtual machine in the management virtual machine; the server divides a service provided for a guest virtual machine by the kernel virtual machine into multiple service components, where the guest virtual machine is a virtual machine corresponding to the guest identifier; and the server runs the multiple service components in execution environments corresponding to permission of the multiple service components, where the kernel virtual machine includes the multiple execution environments, and the multiple execution environments have different permission. According to this solution, a kernel virtual machine corresponding to each guest identifier may be created in a management virtual machine, and multiple service components provided for a guest virtual machine by a kernel virtual machine are run in execution environments corresponding to permission of the service components, so that longitudinal kernel virtualization layer isolation and lateral service layer isolation are performed on the management virtual machine. Therefore, service components that are corresponding to all guest identifiers and have different permission can still run in a same management virtual machine, thereby improving performance of communication between the service components, reducing resources required for running a virtual machine, and enhancing security of the service components.

Embodiment 5

Figure 9:
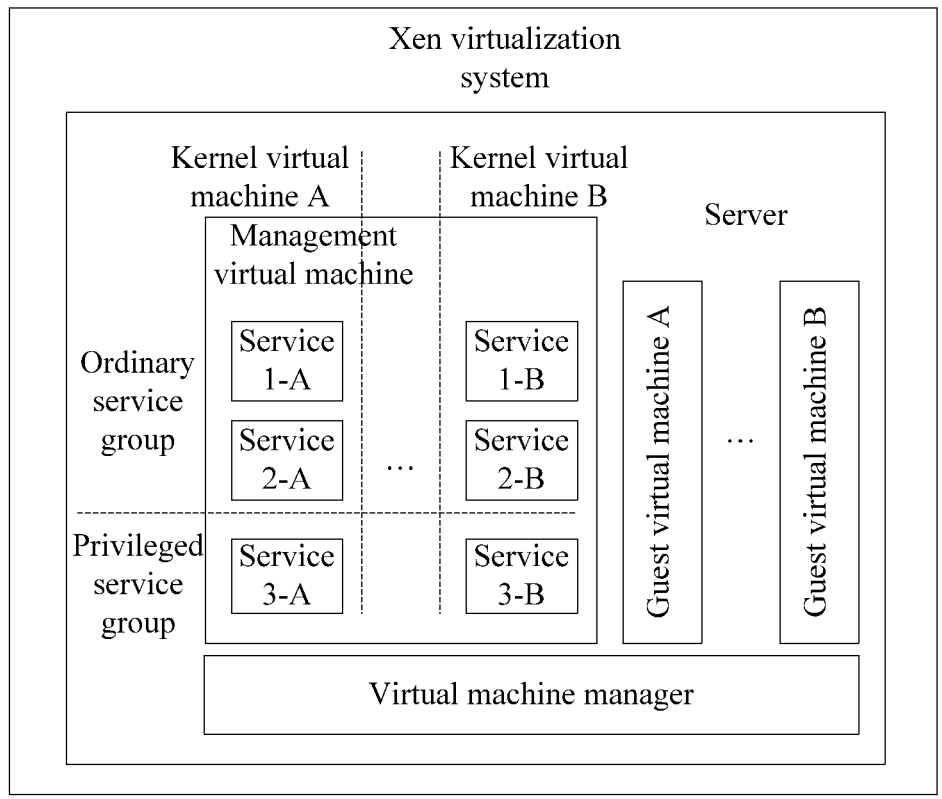
FIG. 9 is a schematic structural diagram of a Xen virtualization system according to an embodiment of the present invention.

This embodiment of the present invention provides a virtualization system, and as shown in FIG. 9, the virtualization system may be a Xen virtualization system, where the Xen virtualization system includes one server according to the foregoing embodiment. One virtual machine manager, one management virtual machine according to the foregoing embodiment, and at least one guest virtual machine corresponding to each guest identifier run on the one server, where the virtual machine manager is configured to manage the management virtual machine and these guest virtual machines, the management virtual machine includes a kernel virtual machine that is in a one-to-one correspondence with each guest identifier, and one kernel virtual machine provides a service for at least one guest virtual machine corresponding to one guest identifier.

By executing the isolation method for a management virtual machine according to the foregoing embodiment, the server in the Xen virtualization system provided by this embodiment of the present invention may perform longitudinal kernel virtualization layer isolation on basic services that are in a domain-0 and provided by guest virtual machines corresponding to different guest identifiers, to form logical domains corresponding to the different guest identifiers, and perform lateral service layer isolation on multiple service components that provide the basic services, that is, group the multiple service components to form different service groups. This embodiment of the present invention performs the foregoing two-layer isolation on the domain-0, which can, in addition to ensuring security of the domain-0, improve performance of communication between the service components, and reduce resources required for running a virtual machine.

Exemplarily, as shown in FIG. 3, it is assumed that three guest virtual machines, which are guest virtual machine A, guest virtual machine B, and guest virtual machine C, run on the server that is provided by this embodiment of the present invention to implement a Xen virtualization system. According to the isolation method for a management virtual machine provided by this embodiment of the present invention, longitudinal kernel virtualization layer isolation is performed on basic services that are in the domain-0 and provided by all guest virtual machines corresponding to guest identifier A, all guest virtual machines corresponding to guest identifier B, and all guest virtual machines corresponding to guest identifier C, to form logical domain A corresponding to guest identifier A, logical domain B corresponding to guest identifier B, and logical domain C corresponding to guest identifier C; and lateral service layer isolation is performed on the multiple service components that provide the basic services, that is, the multiple service components are run in execution environments corresponding to permission of the service components, to form different service groups, such as a common service group and a privileged service group.

Figure 10:
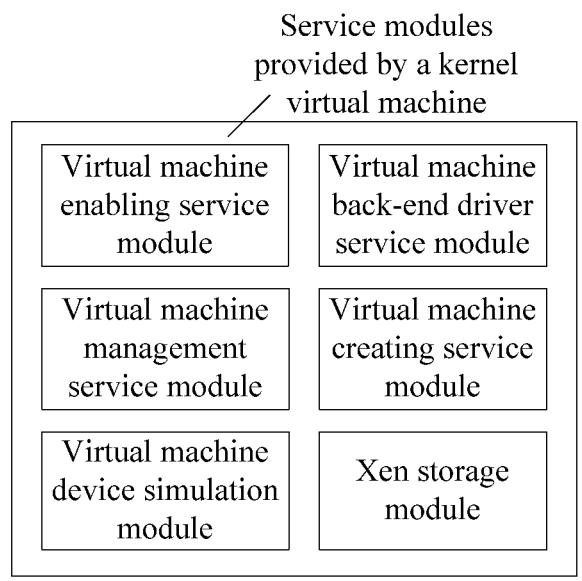
FIG. 10 is a schematic diagram of a service module provided by a kernel virtual machine according to an embodiment of the present invention.

The isolation method for a management virtual machine provided by the embodiment of the present invention requires not only support of a server hardware structure but also support of software. As shown in FIG. 10, in software implementation, multiple service components that provide a basic service for a guest virtual machine and are of a kernel virtual machine created by a server may be implemented by different service modules. Specifically, for the multiple service components provided by this embodiment of the present invention, the service modules that implement these service components are: a virtual machine enabling service module corresponding to a virtual machine enabling service component, a virtual machine management service module corresponding to a virtual machine management tool set component, a virtual machine device simulation module corresponding to a virtual machine device simulation component, a virtual machine creating service module corresponding to a virtual machine creating tool component, a virtual machine back-end driver service module corresponding to a virtual machine back-end driver component, and a Xen storage module corresponding to a Xen storage component.

This embodiment of the present invention provides a virtualization system, where the virtualization system includes the server according to the foregoing embodiment. The server may acquire a guest identifier, and search, according to the guest identifier, at least one kernel virtual machine in a management virtual machine for a kernel virtual machine corresponding to the guest identifier; when the server does not find the kernel virtual machine in the at least one kernel virtual machine, the server creates the kernel virtual machine in the management virtual machine; the server divides a service provided for a guest virtual machine by the kernel virtual machine into multiple service components, where the guest virtual machine is a virtual machine corresponding to the guest identifier; and the server runs the multiple service components in execution environments corresponding to permission of the multiple service components, where the kernel virtual machine includes the multiple execution environments, and the multiple execution environments have different permission. According to this solution, a kernel virtual machine corresponding to each guest identifier may be created in a management virtual machine, and multiple service components provided for a guest virtual machine by a kernel virtual machine are run in execution environments corresponding to permission of the service components, so that longitudinal kernel virtualization layer isolation and lateral service layer isolation are performed on the management virtual machine. Therefore, service components that are corresponding to all guest identifiers and have different permission can still run in a same management virtual machine, thereby improving performance of communication between the service components, reducing resources required for running a virtual machine, and enhancing security of the service components.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual demands to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present invention. The foregoing storage medium includes any medium that can store program code, such as a universal serial bus (USB) flash drive, a removable hard disk, a read-only memory (ROM), RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An isolation method for a management virtual machine, comprising:
    receiving, by a server, a request message to create a guest virtual machine corresponding to a guest identifier,
    acquiring, by the server, the guest identifier from the request message;
    creating, by the server, the guest virtual machine according to the request message;
    searching, by the server according to the guest identifier, the management virtual machine for a kernel virtual machine corresponding to the guest identifier;
    accessing the kernel virtual machine to provide a service for the guest virtual machine when the server finds the kernel virtual machine in the management virtual machine; and
    performing the following steps when the server does not find the kernel virtual machine in the management virtual machine:
        creating the kernel virtual machine in the management virtual machine;
        dividing, by the server, code of a service provided for a guest virtual machine by the kernel virtual machine into multiple service components; and
        running, by the server, the multiple service components in multiple execution environments corresponding to different permissions of the service components,
    wherein the kernel virtual machine comprises the multiple execution environments.

2. The isolation method for a management virtual machine according to claim 1, wherein when the kernel virtual machine is created in the management virtual machine, the method further comprises:
    acquiring, by the kernel virtual machine, an indication message sent by a virtual machine manager, wherein the indication message is sent to the virtual machine manager by the guest virtual machine, wherein the indication message is also sent to the kernel virtual machine by the virtual machine manager after the virtual machine manager determines, according to the guest identifier carried in the indication message, the kernel virtual machine corresponds to the guest identifier, and wherein the indication message is used to indicate a service required by the guest virtual machine; and
    responding, by the kernel virtual machine according to service request information carried in the indication message, to the service required by the guest virtual machine.

3. The isolation method for a management virtual machine according to claim 1, wherein dividing the service provided for the guest virtual machine by the kernel virtual machine into multiple service components comprises:
    dividing code of the service into multiple function code blocks according to a function of the kernel virtual machine; and
    running the multiple function code blocks in multiple service processes to form the multiple service components, and wherein the multiple function code blocks are in a one-to-one correspondence with the multiple service processes.

4. The isolation method for a management virtual machine according to claim 1, wherein running the multiple service components in execution environments corresponding to permission of the service components comprises:
    grouping the multiple service components according to the permission of the multiple service components such that different groups of service components have different permission; and
    running the different groups of service components in the multiple service components in execution environments corresponding to the permission of the different groups of service components.

5. The isolation method for a management virtual machine according to claim 4, wherein the permission of the multiple service components is determined by:
    acquiring system parameters of the multiple service components; and
    determining, according to the system parameters of the multiple service components, the permission of the multiple service components that corresponds to the system parameters of the multiple service components.

6. The isolation method for a management virtual machine according to claim 1, wherein after the running the multiple service components in execution environments corresponding to permission of the service components, the method further comprises limiting the permission of the multiple service components according to a preset policy, and wherein the preset policy comprises at least one of an access operation and a control operation.

7. The isolation method for a management virtual machine according to claim 1, wherein after running the multiple service components in execution environments corresponding to permission of the service components, the method further comprises:
monitoring running states of the multiple service components; and
re-enabling one service component of the multiple service components when an error occurs in a running state of the one service component.

8. The isolation method for a management virtual machine according to claim 1, wherein after the running the multiple service components in execution environments corresponding to permission of the service components, the method further comprises periodically re-enabling each of the multiple service components according to a preset time, and wherein the preset time is a preset time corresponding to each service component.

9. The isolation method for a management virtual machine according to claim 1, wherein creating the kernel virtual machine in the management virtual machine comprises:
creating, in the management virtual machine and according to a kernel virtualization technology, a kernel virtualization container corresponding to the guest identifier; and
disposing, in the kernel virtualization container, a service provided for the guest virtual machine by the management virtual machine to create the kernel virtual machine.

10. The isolation method for a management virtual machine according to claim 1, wherein a manner of communication between the multiple service components is interprocess communication.

11. The isolation method for a management virtual machine according to claim 1, wherein the multiple service components comprise at least one of the following: a virtual machine enabling service component, a virtual machine management tool set component, a virtual machine device simulation component, a virtual machine creating tool component, a virtual machine back-end driver component, and a storage component.

12. A server, comprising:
a memory storing executable instructions which comprises a management virtual machine comprising a plurality of kernel virtual machines each having an identifier; and
a processor coupled to the memory, wherein the processor is configured to perform the steps of:
receiving a request message to create a guest virtual machine corresponding to a guest identifier;
acquiring the guest identifier from the request message;
creating the guest virtual machine according to the request message;
searching, according to the guest identifier, the management virtual machine for a kernel virtual machine corresponding to the guest identifier;
accessing the kernel virtual machine to provide a service for the guest virtual machine when the server finds the kernel virtual machine in the management virtual machine; and
performing the following steps when the server does not find the kernel virtual machine in the management virtual machine:
creating the kernel virtual machine in the management virtual machine;
dividing code of a service provided for a guest virtual machine by the kernel virtual machine into multiple service components; and
running the multiple service components in multiple execution environments corresponding to different permissions of the service components,
wherein the kernel virtual machine comprises the multiple execution environments.

13. The server according to claim 12, wherein the processor is further configured to:
acquire an indication message sent by a virtual machine manager; and
respond, according to service request information carried in the indication message, with a service required by the guest virtual machine,
wherein the indication message is sent to the virtual machine manager by the guest virtual machine and is sent to the kernel virtual machine by the virtual machine manager after the virtual machine manager determines, according to the guest identifier carried in the indication message, the kernel virtual machine corresponds to the guest identifier, and
wherein the indication message is used to indicate the service required by the guest virtual machine.

14. The server according to claim 12, wherein the processor is further configured to:
divide code of the service into multiple function code blocks according to a function of the kernel virtual machine; and
run the multiple function code blocks in multiple service processes to form the multiple service components, wherein the multiple function code blocks are in a one-to-one correspondence with the multiple service processes.

15. The server according to claim 12, wherein the processor is further configured to:
group the multiple service components according to the permission of the multiple service components such that different groups of service components have different permission; and
run the different groups of service components in the multiple service components in execution environments corresponding to the permission of the different groups of service components.

16. The server according to claim 15, wherein processor is further configured to:
acquire system parameters of the multiple service components; and
determine, according to the system parameters of the multiple service components, the permission of the multiple service components that corresponds to the system parameters of the multiple service components.

17. The server according to claim 12, wherein the processor is further configured to limit the permission of the multiple service components according to a preset policy after running the multiple service components in the execution environments corresponding to the permission of the service components, and wherein the preset policy comprises at least one of an access operation and a control operation.

18. The server according to claim 12, wherein the processor is further configured to:
monitor running states of the multiple service components after running the multiple service components in the execution environments corresponding to the permission of the multiple service components; and re-enable a service component of the multiple service components when an error occurs in a running state of the service component in the multiple service components.

19. The server according to claim 12, wherein the processor is further configured to periodically re-enable each of the multiple service components correspondingly according to a preset time after running the multiple service components in the execution environments corresponding to the permission of the service components, and wherein the preset time is a preset time corresponding to each service component.

20. The server according to claim 12, wherein processor is further configured to:

create, in the management virtual machine and according to a kernel virtualization technology, a kernel virtualization container corresponding to the guest identifier; and dispose, in the kernel virtualization container, a service provided for the guest virtual machine by the management virtual machine to create the kernel virtual machine.

21. The server according to claim 12, wherein a manner of communication between the multiple service components is interprocess communication.

22. The server according to claim 12, wherein the multiple service components comprise at least one of the following: a virtual machine enabling service component, a virtual machine management tool set component, a virtual machine device simulation component, a virtual machine creating tool component, a virtual machine back-end driver component, and a storage component.

23. A non-transitory computer readable medium comprising instructions that when executed performs the steps of:

receiving, by a server, a request message to create a guest virtual machine corresponding to a guest identifier;

acquiring, by the server, the guest identifier from the request message;

creating, by the server, the guest virtual machine according to the request message;

searching, by the server according to the guest identifier, a management virtual machine of the server for a kernel virtual machine corresponding to the guest identifier;

accessing the kernel virtual machine to provide a service for the guest virtual machine when the server finds the kernel virtual machine in the management virtual machine; and performing the following steps when the server does not find the kernel virtual machine in the management virtual machine:

creating the kernel virtual machine in the management virtual machine when the kernel virtual machine is not found in a plurality of kernel virtual machines in the server;

dividing code of a service provided for a guest virtual machine by the kernel virtual machine into multiple service components; and running the multiple service components in multiple execution environments corresponding to different permissions of the service components, wherein the kernel virtual machine comprises the multiple execution environments.

* * * * *